United States Patent Office 3,362,825
Patented Jan. 9, 1968

3,362,825
DIAZOTYPE PRECOATS

Mark L. Moskowitz, Endicott, and Bert E. Tripp, Binghamton, N.Y., assignors to General Aniline & Film Corporation, New York, N.Y., a corporation of Delaware No Drawing. Filed June 8, 1964, Ser. No. 373,539
6 Claims. (Cl. 96—75)

ABSTRACT OF THE DISCLOSURE

Diazotype photoprinting material having on a base, a coating of a graft copolymer of an N-vinyl lactam and an acrylic ester, underlying a light-sensitive diazotype coating.

The present invention relates to light-sensitive diazotype materials having a base sheet precoated with an emulsion of a synthetic resin, and bearing on the precoated surface, a diazotype photo-sensitizing composition.

Diazotype reproduction is based upon the principle that certain aromatic diazonium compounds which are destroyed on exposure to actinic light, react to form highly colored dyestuffs when coupled with azo coupling components such as phenols, naphthols, and the like. Reproductions are obtained by exposing to actinic light, under a graphic original having image and background areas which are relatively light absorptive and light transmissive, sheet material bearing such a light-sensitive diazonium compound, and coupling the residue thereof which remains in the unexposed areas with an azo coupling component, yielding a dark-colored positive from a positive original.

In two-component diazotype materials, the diazonium compound and coupler are both present in the light-sensitive layer together with a stabilizer (usually an acidic compound) to prevent coupling. After exposure to light, the stabilizer is neutralized or rendered ineffective and the coupling reaction takes place, e.g., by exposure to ammonia vapor.

In one-component diazotype materials, only the diazo compound is present in the light-sensitive layer. After exposure to light, the coupling reaction is caused to take place by treating the sensitized material with an alkaline solution containing couplers or, if certain types of diazo compounds are used, the one-component materials may be developed by use of a neutral or slightly acidic solution of couplers.

The requirements for diazotype printing materials include stability in storage before and after the light exposure; rapid printing and developing, and reproductions of originals of different densities over a range of speeds. The image must be distinct, sharp and permanent, and the background of the prints must be clean so as to insure high contrast and good legibility. The prints should preferably have a good writing surface, adapted to accept aqueous inks and coloring compositions.

Precoating of the base material can improve the product by providing a surface in which the particles on the surface are arranged more regularly than the pores of the uncoated base. Accordingly, the photosensitive compound is more efficiently utilized when it is coated upon a base material that has been precoated. A precoat often intensifies the image produced on the photosensitive surface, and improves the appearance of the final print by increasing the density and the color brilliance of the image.

However, in some cases, precoating has been found to reduce the printing speed of the material, to cause objectionable discoloration of the background of the diazo prints, and to cause excessive feathering when writing on the surface with an aqueous ink.

It is an object of this invention to improve the appearance, intensity, density, color brilliance, printing range and legibility of diazo prints by a precoat on the base material.

It is a further object of this invention to provide a precoat on the base material for a diazonium photosensitive composition which avoids discoloration of the final print and avoids reduction of the printing speed.

It is also an object of this invention to provide a method of precoating a base material in the preparation of diazotype photosensitive materials which precoating will improve the appearance, intensity, printing range, density, color brilliance and legibility of the diazo prints produced by the method of this invention.

It is still a further object of this invention to provide a diazotype photosensitive sheet which is wettable and will permit writing on the surface of the diazo print with aqueous ink without undesirable feathering.

Other objects and advantages of the invention will become apparent from the following description.

In accomplishing the aforesaid objects, light-sensitive diazotype material is prepared according to this invention by precoating a base sheet of paper, film, cloth or other suitable fabric, with an aqueous dispersion of a graft copolymer of an N-vinyl lactam and an acrylic ester monomer, and after drying, applying to the precoated surface, a one- or two-component diazotype sensitizing composition.

The graft copolymers of N-vinyl lactams and an acrylic ester are conveniently prepared by subjecting a mixture of an acrylic ester monomer in an aqueous solution of a polymeric N- vinyl lactam to polymerization conditions in the presence of a polymerization catalyst until an emulsion is produced. More specific details concerning the aforementioned graft copolymers can be found in Belgian Patent 603,836 and French Patent 1,309,439.

N-vinyl lactams and water soluble polymers thereof, and methods for their production are well known in the art. This, for example, U.S. Patent 2,317,804 discloses a suitable method for preparing N-vinyl lactams and U.S. Patents 2,265,450 and 2,335,454 disclose methods for preparing water-soluble polymers thereof and aqueous solutions containing the same. As examples of N-vinyl lactams which may be employed in producing in known manner the operative aqueous solutions of water-soluble polymers thereof, there may be mentioned the N-vinyl derivatives of gamma-, delta-, and epsilon-lactams (N-vinyl derivatives of the cyclic amides of gamma-, delta-, and epsilon-aminocarboxylic acids of the aliphatic series) and lower alkyl (methyl, ethyl) substituted derivatives of such N-vinyl lactams. Among this group, N-vinyl-2-pyrrolidone (otherwise referred to as 1-vinyl-2-pyrrolidone or N-vinyl-$\alpha$-pyrrolidone) is preferred. As illustrative of other N-vinyl lactams within this group there may be mentioned N-vinyl-2-piperidone, N-vinyl-6-caprolactam, N-vinyl-5-methyl-2-pyrrolidone, N-vinyl - 3,3-dimethyl-2-pyrrolidone, and the like. Other N-vinyl lactcms which may be employed include N-vinyl-hexahydrophthalimidine, N-vinyl-naphthostyrile, etc. Depending upon the extent of polymerization, these polymeric N-vinyl lactams may have molecular weights ranging from at least 400 up to 2,000,000 or more. The Fickentscher K value is convenient designation of relative degree of polymerization or relative molecular weight. Generally, there may be employed those polymeric N-vinyl lactams having a K value of about 10 to 200 and preferably about 20 to 60, and mixtures thereof.

The acrylic ester monomer (or mixtures thereof) employed herein may be any ester of acrylic, $\alpha$-methacrylic -ethacrylic, or -chloroacrylic acid with a monohydroxylic organic compound which may be saturated or unsaturated, aromatic or aliphatic, straight or branched chain, substituted or unsubstituted. As examples of suitable monohydroxylic organic compounds which may be employed for esterifying one of the above-mentioned acrylic acids, there may be mentioned monohydric alcohols such as methyl, ethyl, propyl, butyl, isobutyl, 2-ethyl hexyl, amyl, hexyl, cyclohexyl, dodecyl, octyl, tridecyl, tetradecyl, pentadecyl, hexadecyl, octadecyl, oleyl, arachidyl, ceryl, dimethylaminoethyl, tertiary butylaminoethyl, and benzyl alcohol, as well as monohydric phenols such as phenol, naphthol and the like. These esters are substantially water-insoluble.

The graft copolymer emulsions employed in accordance with this invention are aqueous dispersions of the finely divided graft copolymers described above, wherein the particle size may range up to 5 microns. The dispersion may contain up to 50% solids but 40 to 55% solids generally permit efficient and uniform application to the base material using conventional coating equipment. After coating the emulsion, the material is dried. The thickness of the deposited graft copolymer is not critical but in general the amount employed is satisfactory when it yields a layer having a thickness of 1 to 10 mils.

A one- or two-component diazotype sensitizing solution is then applied to the precoated surface and dried. Such two-component sensitizing composition may contain any of the usual light-sensitive diazonium compounds and, in this connection, reference is made to the compounds mentioned in U.S. Patent 2,501,874, and in an article by Van der Grinten in "Photographic Journal," vol. 92B, 1952, page 46. The stabilized diazonium compounds derived from N,N-disubstituted p-phenylene diamines are most satisfactory. Examples of such diazos are those derived from N,N-diethyl-p-phenylenediamine; N-benzyl-N-ethyl-p-phenylenediamine; N-phenyl - p-phenylenediamine; N,N - diethyl-2-ethoxy-p-phenylenediamine; N - ethyl-2-methyl-p-phenylenediamine; N,N - bis-($\beta$-hydroxyethyl)-p-phenylenediamine; N-betahydroxyethyl-N-methyl-p-phenylenediamine and the like. These diazos are customarily used in the form of their stable diazonium chloride double salts with zinc chloride, tin chloride, cadmium chloride and the like.

Any of the usual azo coupling components ere satisfactory for use in the two-component sensitizing composition. Examples of suitable couplers are 2,5-xylenol; 2,3-dihydroxynaphthalene; 1,8-dihydroxynaphthalene; resorcinol; octyl-resorcinol; p-methyl-N-phenyl-pyrazolone; the amide of $\alpha$-resorcylic acid; 2-hydroxynaphthalene-3,6-disulfonic acid; H-acid; acetoacetanilide; 2,3-dihydroxynaphthalene-6-sulfonic acid and the like. Other couplers are mentioned in the Van der Grinten article supra.

The two-component sensitizing compositions may contain, in addiiton to the diazonium salts and coupling components, the various adjuncts usual in the manufacture of light-sensitive diazotype materials. These include metal salts for intensification of the dyestuff image, such as ammonium sulfate, nickel sulfate, zinc chloride, and the like. stabilizing agents such as thiourea, thiosinamine, naphthalene trisulfonic acid and the like; acids acting to retard precoupling such as acetic acid, boric acid, tartaric acid and the like; hygroscopic agents such as glycol, glycerin and the like; and wetting agents such as saponin, lauryl sulfonate, keryl benzene sulfonate, oleic acid N-methyl tauride and the like.

It is also recommended that agents be used which have the property of accelerating the rate of azo dye color development, particularly under conditions of low ammonia concentration. For this purpose there are used thiourea derivatives and particularly those in which either one or both nitrogen atoms are substituted by an aliphatic radical. Examples of such compounds are 1-allyl-3-$\beta$-hydroxyethyl-2-thiourea; 1-allyl-2-thiourea and the like.

In the case of one-component diazotype materials, the diazos employed may be, for example, diazos from p-phenylene diamines in which one nitrogen atom is substituted by an alkyl, aryl or aralkyl group. Typically, I have used the diazo from p-(N-ethyl-N-benzyl)-aminoaniline; p-(N-diethyl)-amino-n-chloroaniline; p - (N - di-n-hexyl)-aminoaniline; p-(N-di-isoamyl)-amminoaniline and the like.

Diazos such as 4'-diazo-2',6'-di-n-propoxy-benzanilide chlorozincate; 4 - diazo-2,5-diethoxy-4'-methoxydiphenyl chloride; 4-p-tolyl-mercapto-2,5-diethoxybenzenediazonium chlorozincate may also be employed.

Similarly, the coupling components are of the type used in the one-component system and may be phloroglucinol, resorcinal, acetoacetanilide, or the like. Neither the diazos nor the couplers are critical to the invention.

The base to which our coating solution is applied may be any of the bases which have been previously suggested for use in the diazotype field, Examples of such bases are high grade all-sulfite bond paper, rayon or cotton cloth, starch-filled cloth, partially hydrolyzed cellulose acetate film base, regenerated cellulose and the like.

The invention will be more fully understood from the following examples which are illustrative only. The parts are by weight unless otherwise stated.

*Example I*

Two samples of twenty and one-half paper stock base were coated with the following precoat solutions and dried:

(a)

| | | |
|---|---|---|
| Water | cc | 50 |
| Thiourea | grams | 5 |
| Emulsion of the graft copolymer of N-vinyl-2-pyrrolidone and methyl methacrylate (solids content of 40%) | cc | 15 |
| Water to | cc | 100 |

(b)

| | | |
|---|---|---|
| Water | cc | 50 |
| Thiourea | grams | 5 |
| Polystyrene emulsion (solids content of 40%) | cc | 15 |
| Water to | cc | 100 |

Subsequently each of the above precoated papers were coated with the following two-component sensitizing solution and dried:

| | | |
|---|---|---|
| Water | cc | 50 |
| Dipropylene glycol | cc | 3 |
| Isopropanol | cc | 2 |
| Tartaric acid | grams | 3 |
| Allyl $\beta$-hydroxyethyl thiourea | do | 1 |
| Thiourea | do | 5 |
| Zinc chloride | do | 6 |
| Sodium 6,7-dihydroxynaphthalene-2-sulfonate | do | 4 |
| 4-diethylaminobenzenediazonium chlorozincate | do | 0.6 |
| 4 - (N - ethyl - n - 2 - hydroxyethyl) aminobenzenediazonium chlorozincate | do | 0.5 |
| Saponin | do | 0.1 |
| Water to | cc | 100 |

These light-sensitive papers were exposed under a translucent original having actinically opaque lines to actinic light and developed by exposure to ammonia, and a visual comparison was made.

The paper precoated with the aqueous emulsion of the graft copolymer of vinyl pyrrolidone and methyl methacrylate produced lines with fully as much density as the paper precoated with the commercial polystyrene emulsion. However, the paper treated in accordance with the invention had dye image areas that were of a richer, brighter blue.

*Example II*

Papers having the precoat treatments outlined in (a) and (b) of Example I were sensitized with the following two-component diazotype solution, and dried:

| | | |
|---|---|---|
| Water | cc | 60 |
| Dipropylene glycol | cc | 3 |
| Isopropanol | cc | 2 |
| Tartaric acid | grams | 3 |
| Allyl β-hydroxyethyl thiourea | do | 1 |
| Thiourea | do | 5 |
| H-acid | do | 0.6 |
| Sodium-6,7-dihydroxynaphthalene-2-sulfonate | do | 0.6 |
| 2,5 - diethoxy - 4 - morpholinobenzenediazonium chlorozincate | grams | 0.8 |
| 4 - (N - ethyl - N - 2 - hydroxyethyl) - aminobenzenediazonium chlorozincate | grams | 0.4 |
| Zinc chloride | do | 6 |
| Victoria Blue Satin (1%) | cc | 0.5 |
| Saponin | gram | 0.1 |
| Water to | cc | 100 |

The papers were printed as in Example I under a negative printing original and developed by exposure to ammonia. The resulting prints showed white lines against a cyan background. Comparison of the prints demonstrated that the precoat of the present invention produced image densities as high as those produced with the polystyrene emulsion precoat. Further, it was noted that richness and brightness of color produced with the precoat of the invention was better than that obtained with the polystyrene emulsion precoat.

*Example III*

Papers having the precoat treatments outlined in (a) and (b) of Example I were sensitized with the following one-component diazotype solution and dried:

| | | |
|---|---|---|
| Water | cc | 60 |
| Butanol | cc | 0.3 |
| Tartaric acid | gram | 0.3 |
| Aluminum sulfate | do | 0.3 |
| Thiourea | do | 0.2 |
| Sodium-2,7-naphthalenedisulfonate | do | 1 |
| Diammonium citrate | do | 0.5 |
| 4 - (N - benzyl - N - ethylamino) benzenediazonium chlorozincate | grams | 1 |
| Water to | cc | 100 |

These papers were printed as in Example I and developed by being treated with a solution of:

| | | |
|---|---|---|
| Phloroglucinol | gram | 0.6 |
| Resorcinol | do | 0.4 |
| Hydroquinone | do | 0.1 |
| Isopropyl naphthalene-sodium sulfonate | do | 0.07 |
| Potassium tetraborate, pentahydrate | do | 0.07 |
| Disodium phosphate, anhydrous | do | 1.25 |
| Trisodium phosphate | do | 2.5 |
| Water to | cc | 100 |

The resulting prints showed dark lines against a white background and in a comparison of the papers having the two types of precoats, the paper precoated with the aqueous emulsion of the graft copolymer of vinyl pyrrolidone and methyl methacrylate produced lines with far greater density than the paper precoated with the polystyrene emulsion.

Variations and modifications which will be obvious to those skilled in the art can be made in the foregoing examples without departing from the scope of the invention.

We claim:

1. Light-sensitive diazotype photoprinting material having on a base sheet, a dried coating of aqueous dispersion of graft copolymers of an N-vinyl lactam and an acrylic ester and a light-sensitive diazonium compound on said copolymer coating.

2. The diazotype photoprinting material as defined in claim 1 wherein the N-vinyl lactam is N-vinyl-2-pyrrolidone.

3. The diazotype photoprinting material of claim 1 wherein the acrylic ester is selected from the group consisting of ester or acrylic methacrylic, α-ethacrylic and α-chloroacrylic acids.

4. Light-sensitive diazotype photoprinting material having on a base sheet, a dried coating of aqueous dispersion of graft copolymers of an N-vinyl lactam and an acrylic ester and a two-component diazotype sensitizing composition comprising a light-sensitive diazonium compound and an azo coupling component on said copolymer coating.

5. The diaztype photoprinting material as defined in claim 1 wherein the N-vinyl lactam is N-vinyl-2-pyrrolidone.

6. The diazotype photoprinting material of claim 1 wherein the acrylic ester is selected from the group consisting of ester or acrylic methacrylic, α-ethacrylic and α-chloroacrylic acids.

References Cited

UNITED STATES PATENTS 2,805,159 9/1957 Umkauf ---- 96—75

FOREIGN PATENTS 717,835 11/1954 Great Britain.
732,424 6/1955 Great Britain.

NORMAN G. TORCHIN, *Primary Examiner.*
C. L. BOWERS, JR., *Assistant Examiner.*